United States Patent
Jabbar (10) Patent No.: US 12,081,436 B2
(45) Date of Patent: Sep. 3, 2024

(54) SYSTEM AND METHOD FOR A TIME-SENSITIVE NETWORK

(71) Applicant: GE Aviation Systems LLC, Grand Rapids, MI (US)

(72) Inventor: Abdul Jabbar, Altamont, NY (US)

(73) Assignee: GE Aviation Systems LLC, Grand Rapids, MI (US)

( * ) Notice: Subject to any disclaimer, the term of this patent is extended or adjusted under 35 U.S.C. 154(b) by 177 days.

(21) Appl. No.: 17/100,187

(22) Filed: Nov. 20, 2020

(65) Prior Publication Data

US 2022/0166720 A1    May 26, 2022

(51) Int. Cl.
*H04L 47/12*     (2022.01)
*H04L 41/12*     (2022.01)

(52) U.S. Cl.
CPC .............. *H04L 47/12* (2013.01); *H04L 41/12* (2013.01)

(58) Field of Classification Search
CPC ................................ H04L 47/12; H04L 41/12
USPC ........................................................ 370/235
See application file for complete search history.

(56) References Cited

U.S. PATENT DOCUMENTS

| | | | |
|---|---|---|---|
| 7,636,781 B2 | 12/2009 | Li et al. | |
| 9,229,842 B2 | 1/2016 | Broda et al. | |
| 10,038,605 B2 | 7/2018 | Veeravalli et al. | |
| 10,754,816 B2 | 8/2020 | Kasichainula | |
| 2006/0251119 A1* | 11/2006 | Ramesh | H04L 47/15 370/468 |
| 2016/0294697 A1* | 10/2016 | Varadarajan | H04L 47/28 |
| 2017/0255707 A1* | 9/2017 | Trestor | G06F 16/9574 |
| 2018/0237039 A1 | 8/2018 | Mong et al. | |
| 2019/0056229 A1* | 2/2019 | Sarkar | G01C 21/3484 |
| 2020/0083978 A1 | 3/2020 | Bush et al. | |
| 2020/0228454 A1 | 7/2020 | Bush | |

(Continued)

FOREIGN PATENT DOCUMENTS

| | | |
|---|---|---|
| CN | 108184244 A | 6/2018 |
| CN | 110601888 A | 12/2019 |
| CN | 111740924 A | 10/2020 |

(Continued)

OTHER PUBLICATIONS

Xi Jun et al. "Real-Time Scheduling of Massive Data in Time Sensitive Networks With a Limited Number of Schedule Entries", Jan. 7, 2020, 17 pages, China.

*Primary Examiner* — Nizam U Ahmed
(74) *Attorney, Agent, or Firm* — McGarry Bair PC (57) ABSTRACT

A method for scheduling a transmission of data flows in a network. The method includes identifying an unscheduled set of data flows to be scheduled for a respective transmission on a subset of the set of links defining a respective path, scheduling a respective transmission of a subset of data flows on the respective path, wherein the schedule defines a start time, a duration, and a cycle time of the transmission on each respective link in the path. The method includes determining a conflict between an unscheduled data flow and a scheduled data flow with respect to a link in the path, displaying the unscheduled data flow, the link, and the scheduled data flow with which the conflict occurs, and displaying, for each scheduled data flow, an image depicting each respective link of the path, and a data transmission schedule with respect to each respective link in the path.

20 Claims, 7 Drawing Sheets

(56) References Cited

U.S. PATENT DOCUMENTS

2021/0326681 A1* 10/2021 Kotler .................... G11C 11/54
2022/0075354 A1* 3/2022 Nixon .............. G05B 19/41835

FOREIGN PATENT DOCUMENTS

WO     20180162071 A1    9/2018
WO     20200167222 A2    8/2020

* cited by examiner

SYSTEM AND METHOD FOR A TIME-SENSITIVE NETWORK

TECHNICAL FIELD

This disclosure relates generally to time sensitive networks, and more specifically to systems and methods for scheduling data flows in a time-sensitive network.

BACKGROUND

Various types of control systems communicate data between different sensors, devices, and user interfaces, etc., to enable control operations of other powered systems. For example, aircraft, locomotives, automobiles, surgical suites, power plants, etc., include many systems that communicate with each other using Industrial Ethernet networks in order to control operations of the aircraft, locomotives, automobiles, surgical suites, and power plants.

Industrial Ethernet networks are based on layer-2 (Ethernet), but add proprietary protocols to achieve real-time communication. Some systems can use a time-sensitive network (TSN) to communicate data using standard methods for time synchronization and traffic management, allowing deterministic communication over standard Ethernet networks between end-devices. The IEEE 802.1 TSN specification suite standardizes layer-2 communication for networking protocols providing deterministic communication while sharing the same infrastructure. For example, a number of standards to establish various technological paradigms—clock synchronization (802.1AS-2020), frame preemption (802.1Qbu), scheduled traffic (802.1Qbv), and redundancy management (802.1CB). These must work together at the Ethernet layer-2 to ensure that critical control and safety functions are executed while meeting their respective deadlines and constraints. The 802.1Qbv TSN standard provides scheduled transmissions for mission and safety-critical data frames in a predetermined manner.

As TSNs include more complex topologies, with redundant or dynamically changing links and large numbers of devices, the scheduling of the communication flows between the devices becomes increasingly more complex and time consuming.

BRIEF DESCRIPTION

In one aspect, the present disclosure relates to a method for scheduling a transmission of data flows in a network comprising a set of nodes communicatively coupled by a set of links, each link coupling a corresponding pair of nodes. The method comprises identifying an unscheduled set of data flows to be scheduled for a respective transmission on a subset of the set of links defining a respective path from a first originating node to a second destination node, and scheduling a respective transmission of a subset of data flows on a respective path, wherein the schedule defines a start time, a duration, and a cycle time of the transmission on each respective link in the path. The method also includes determining a conflict between an unscheduled data flow and a scheduled data flow with respect to a link in the path; displaying information indicative of the unscheduled data flow, the link, and the scheduled data flow with which the conflict occurs; and displaying, for each scheduled data flow, an image depicting each respective link of the path, and a data transmission schedule chart with respect to each respective link in the path.

In another aspect, the present disclosure relates to a data communication network. The data communication network includes a set of nodes communicatively coupled by a set of links, each link coupling a corresponding pair of nodes, a display device, and a scheduler module communicatively coupled to the display device. The the scheduler module is configured to identify an unscheduled set of data flows to be scheduled for a respective transmission on a subset of the set of links, the subset of the set of links defining a respective path from a first originating node to a second destination node; define a schedule for a respective transmission of a subset of the set of data flows on a respective path, wherein the schedule includes a start time, a duration, and a cycle time of the transmission with respect to each respective link on the path. The scheduler module is further configured to determine a conflict between an unscheduled data flow and a scheduled data flow with respect to a link in the path; provide information indicative of the unscheduled data flow, the first link, and the scheduled flow with which the conflict occurs, to the display device. The display device is configured to display, for each scheduled data flow, an image depicting each respective link of the path, and to display, for each scheduled data flow, a transmission schedule chart with respect to each respective link in the path.

BRIEF DESCRIPTION OF THE DRAWINGS

A full and enabling disclosure of the present description, including the best mode thereof, directed to one of ordinary skill in the art, is set forth in the specification, which refers to the appended figures, in which.

DETAILED DESCRIPTION

The exemplary drawings are for purposes of illustration only and the dimensions, positions, order and relative sizes reflected in the drawings attached hereto can vary.

As used herein, the term "set" or "subset" of elements can be any number of elements, including only one. Additionally, connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection or communicative connection between respective elements.

As used herein, a "controller" or "controller module" can include a component configured or adapted to provide instruction, control, operation, or any form of communication for operable components to affect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. Non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein. In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination can easily be altered to be satisfied by a positive/negative comparison or a true/false comparison. Example comparisons can include comparing a sensed or measured value to a threshold value or threshold value range.

Aspects of the disclosure can be implemented in any environment, apparatus, system, or method having a regulated, restricted, authorized, or otherwise limited "write-access" privileges to a memory or data store component. As used herein, "write-access" means availability or authorization to commit a change to a memory, the change being storing or overwriting data, values, commands, instructions, or any other data, element, or identifier to a memory location, regardless of the function performed by the data, element, or identifier, or regardless of the function or implementation of the environment, apparatus, system, or method. Collectively, "access" to data or "accessing" data can refer to either reading, viewing, or otherwise receiving data from a data store, "writing" data, as referenced above, or a combination thereof.

As used herein, a "topology" can refer to one or more arrangement(s) of a network which can include a plurality of nodes (e.g., sender devices, receiver devices, switches, or bridges) and connecting lines (e.g., communication links, or "hops" including wired communication links or wireless communication links) between the nodes in the network. Each link can communicatively couple a corresponding pair of nodes. A set of links can be coupled in sequence via their respective nodes to define a link path, for example between an originating node and a destination node. Topologies may comprise, but are not limited to, one or more of mesh, star, bus, ring, and tree topologies.

As used herein, the term "installed product" should be understood to include any sort of mechanically operational entity, asset including, but not limited to, aircraft, jet engines, locomotives, gas turbines, and wind farms and their auxiliary systems as incorporated. The term is most usefully applied to large complex powered systems with many moving parts, numerous sensors and controls installed in the system. The term "installed" includes integration into physical operations, for example, such as the use of engines in an aircraft fleet whose operations are dynamically controlled, a locomotive in connection with railroad operations, or apparatus construction in, or as part of, an operating plant building, machines in a factory or supply chain, or the like. As used herein, the terms "installed product," and "powered system" can be used interchangeably. As used herein, the term "automatically" can refer to, for example, actions that can be performed with little or no human interaction.

The TSN standards suite consists of a number of standards and sub-standards that establish technological protocols for communication networks, for example, clock synchronization (802.1AS-2020), frame preemption (802.1Qbu), scheduled traffic (802.1Qbv), and redundancy management (802.1CB). These protocols cooperate at the Ethernet layer-2 to ensure that safety and compliance with their respective parameters and constraints. For example, the 802.1Qbv TSN standard provides scheduled transmissions for safety-critical data frames in a predetermined manner, and is incorporated herein in its entirety. As used herein, "TSN schema" can refer, without limitation, to networks, components, elements, units, nodes, hubs, switches, controls, modules, pathways, data, data frames, traffic, protocols, operations, transmissions, and combinations thereof, that adhere to, are configured for, or are compliant with, one or more of IEEE 802.1 TSN standards.

The 802.1Qbv TSN standard addresses the transmission of critical and non-critical data traffic within a TSN. Critical data traffic is guaranteed for delivery at a scheduled time while non-critical data traffic is usually given lower priority. Various traffic classes have been established according to IEEE 802 1Q that are used to prioritize different types of data traffic.

To achieve desired levels of reliability, TSNs employ time synchronization, and time-aware data traffic shaping. The data traffic shaping uses the schedule to control gating of transmissions on the network switches and bridges (e.g., nodes).

In some aspects, the schedules for such data traffic in TSNs can be determined prior to operation of the network. In other aspects, the schedules for data traffic can be determined during an initial design phase based on system requirements, and updated as desired. For example, in addition to defining a TSN topology (including communication paths, bandwidth reservations, and various other parameters), a network wide synchronized time for data transmission can be predefined. Such a plan for data transmission on communication paths of the network is typically referred to as a "communication schedule" or simply "schedule". As will be disclosed in more detail herein, the schedule for data traffic on a TSN can be determined for a specific data packet over a specific path, at a specific time, for a specific duration.

Time-critical communication between end devices or nodes in TSNs commonly includes "TSN flows" also known as "data flows" or simply, "flows." For example, data flows can comprise datagrams, such as data packets or data frames. Each data flow is unidirectional, going from a first originating or source end device to a second destination end device in a system, having a unique identification and time requirement. These source devices and destination devices are commonly referred to as "talkers" and "listeners." Specifically, the "talkers" and "listeners" are the sources and destinations, respectively, of the data flows, and each data flow is uniquely identified by the end devices operating in the system. It will be understood that for a given network topology comprising a plurality of interconnected devices, a set of data flows between the interconnected devices or nodes can be defined. For example, the set of data flows can be between the interconnected devices. For the set of data flows, various subsets or permutations of the data flows can additionally be defined.

Both end devices and Ethernet switches (commonly called "bridges" or "switching nodes") transmit and receive the data (in one non-limiting example, Ethernet frames) in a data flow based on a predetermined time schedule. The switching nodes and end devices must be time-synchronized to ensure the predetermined time schedule for the data flow is followed correctly throughout the network. In some other aspects, only the Ethernet switches can transmit the data based on the pre-determined schedule, while the end devices, for example legacy devices, can transmit data in an unscheduled manner.

The data flows within a TSN can be scheduled using a single device that assumes fixed, non-changing paths through the network between the talker/listener devices and switching nodes in the network. Alternatively, the data flows can be scheduled using a set of devices or modules. The scheduling devices, whether a single device or a set of devices, can be arranged to define a centralized scheduler. In still other aspects, the scheduler devices can comprise a distributed arrangement. The TSN can also receive non-time sensitive communications, such as rate-constrained communications. In one non-limiting example, the scheduling devices can include an offline scheduling system or module.

In some cases, end devices can be temporarily or permanently taken off-line or cease operation (for example, due to scheduled maintenance, or unexpected device failure), requiring new or updated data flows to be determined and scheduled quickly (for example, in real time) in order to maintain network operation. Due to the relatively large size and complexity of industrial networks, and the relatively large number of possible topologies for the network, determining and scheduling TSN data flows for the network in real time presents many challenges.

Figure 1:
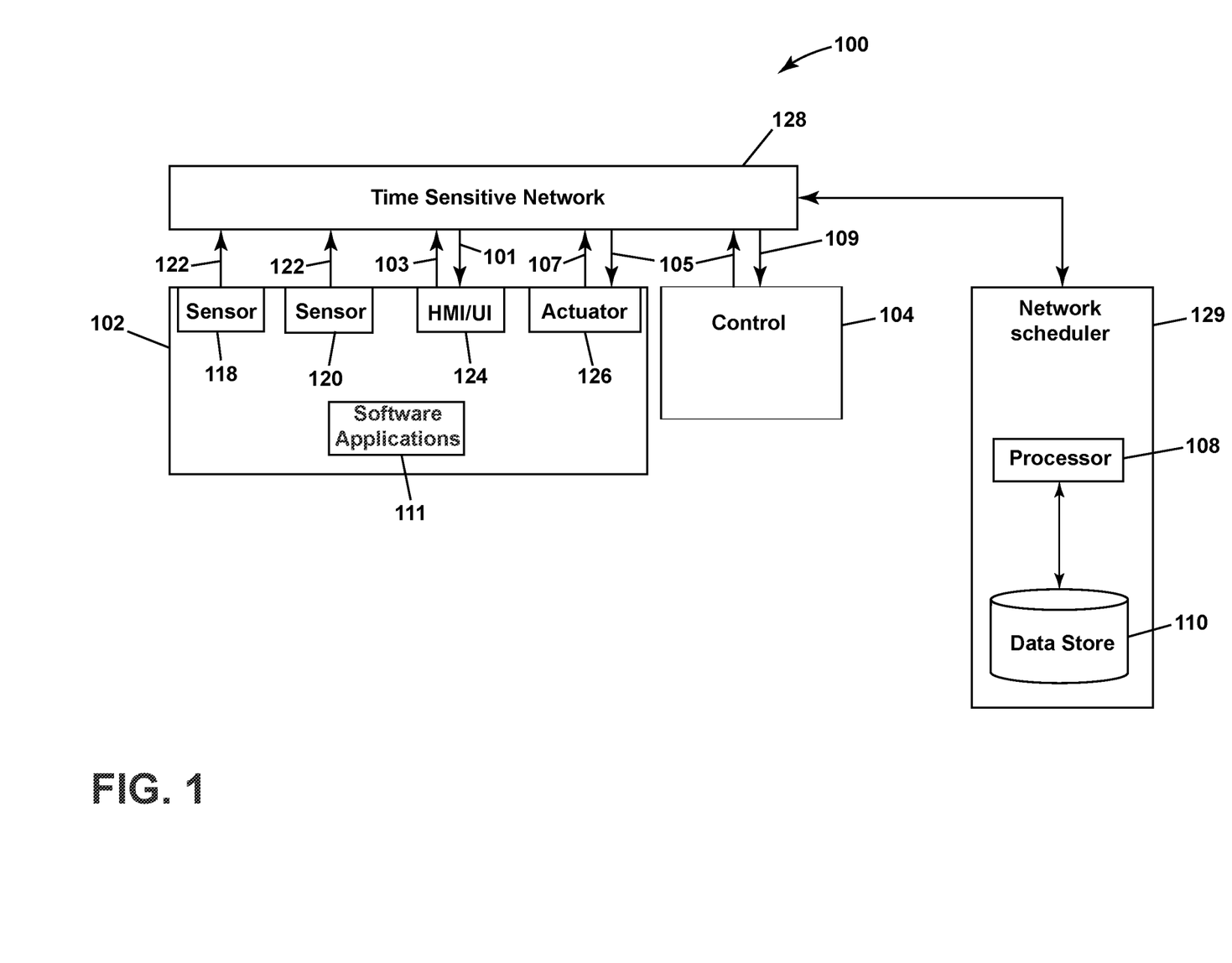
FIG. 1 illustrates a schematic diagram of a system in accordance with non-limiting aspects as described herein.

FIG. 1 illustrates a block diagram of a system 100 architecture in accordance with some aspects. The system 100 can include a TSN 128 and at least one installed product 102. As noted above, the installed product 102 can be, in various aspects, a complex mechanical entity such as the production line of a factory, a gas-fired electrical generating plant, avionics data bus on an aircraft, a jet engine on an aircraft amongst a fleet (e.g., two or more aircraft), a wind farm, a locomotive, etc.

In various aspects, the installed product 102 can include any number of end devices, such as sensors 118, 120, a user platform device 24 such as a human machine interface (HMI) or user interface (UI) 124, and one or more actuators 126. As used herein, the term "actuator" can broadly refer to devices, components, modules, equipment, machinery, or the like that function to perform tasks or operations associated with operation of the installed product 102. In aspects, the installed product 102 can further include one or more software applications 111.

The installed product 102 can further comprise a control system 104 that controls operations of the installed product 102 based on data obtained or generated by, or communicated among devices of the installed product 102 to allow for automated control of the installed product 102 and provide information to operators or users of the installed product 102. The control system 104 can define or determine the data flows and data flow characteristics in the network.

In non-limiting aspects, the system 100 can comprise a network scheduler 129. In such aspects, the scheduler 129 can define or determine a schedule by which all TSN data frames are transmitted. In some aspects, the scheduler 129 can be communicatively coupled to the TSN 128. In other aspects, the scheduler 129 can comprise a separate or stand-alone scheduler 129 that is not communicatively coupled to the TSN 128. In such aspects, the schedule created by the scheduler 129 can be communicated or provided to the TSN 128 by other loading protocols (e.g. ARINC615), other formats, (e.g. ARINC665), or by manual entry or loading of data. In another aspect, the scheduler 129 may be combined with or incorporated by another component in the system 100. For example, in non-limiting aspects, the control system 104 can include the scheduler 129.

In some aspects, the scheduler 129 can include a memory or computer data store 110 and one or more processor or processing modules 108 (e.g., microprocessors, integrated circuits, field programmable gate arrays, etc.) that perform operations to determine the schedule for the transmission of TSN data frames. The processing module 108 can, for example, be a conventional microprocessor, and can operate to control the overall functioning of the scheduler 129. The data store 110 can provide information to the processing module 108 and can store results or information from the processing module 108. The data store 110 can comprise any combination of one or more of a hard disk drive, RAM (random access memory), ROM (read-only memory), flash memory, etc. The data store 110 can store software that programs the processing module 108 to perform functionality as described herein.

The processing module 108, according to some aspects, can access the data store 110 to create a prediction or result (e.g., a predicted schedule or data flow) that can be transmitted back to the installed product 102 as appropriate (e.g., for display to a user, operation of the installed product, operation of another system, or input to another system).

The TSN 128 can supply data (e.g., via a data flow) from at least one installed product 102 to the scheduler 129. The data can include information related to the data flows associated with the network 128. The scheduler 129 is configured to calculate, generate, or otherwise determine a schedule for the transmission of each data flow through the TSN 128. For example, in an aspect, the scheduler module 129 can receive information associated with one or more data flows and determine a classification for each data flow. Based on the classification, the scheduler 129, in one or more aspects, can determine a schedule for the transmission of each data flow through the TSN 128. The control system 104 can operatively control one or more operations of the installed product 102 based on the transmitted data or data frame(s).

In some aspects, the TSN 128 can supply output from the network scheduler 129 to at least one of user platforms such as HMI/UI 124, to the installed product 102, to other systems or a combination thereof. In some aspects, signals or data received by the HMI/UI 124, installed product 102 and other systems can modify the state or condition or another attribute of one or more physical elements or end devices of the installed product 102.

The HMI/UI 124 can communicate via the TSN 128. For example, the HMI/UI 124 can receive data 101 that is to be presented to a user or operator TSN 128, scheduler 129, or control system 104 and that can communicate data 103 received from the user or operator to one or more other devices of the control system 104. The HMI/UI 124 can comprise a display device, a touchscreen, laptop, tablet computer, mobile phone, speaker, haptic device, or other device that communicates or conveys information to a user or operator.

In aspects, the sensors 118, 120 can comprise any conventional sensor or transducer. For example, in an aspect, at least one of the sensors 118, 120 can comprise a camera that generates video or image data, an x-ray detector, an acoustic pick-up device, a tachometer, a global positioning system receiver, a wireless device that transmits a wireless signal and detects reflections of the wireless signal in order to generate image data, or another device.

The one or more actuators 126, (e.g., devices, equipment, or machinery that move to perform one or more operations of the installed product 102 that is controlled by the control system 104) can communicate using the TSN 128. Non-limiting examples of actuators 126 include brakes, throttles, robotic devices, medical imaging devices, lights, turbines, etc. The actuators 126 can communicate status data 107 of the actuators 126 to one or more other devices of the installed product 102 via the TSN 128. The status data 107 can represent a position, state, health, or the like, of the actuator 126 sending the status data 107. The actuators 126 can receive command data 105 from one or more other devices of the installed product or control system via the TSN 128. The command data 105 can represent instructions that direct the actuators 126 how and/or when to move, operate, etc.

The control system 104 can communicate a variety of data between or among the end devices via the TSN 128 in response to the one or more software applications 111. For example, the control system 104 can communicate the command data 105 to one or more of the devices and/or receive data 109, such as status data 107 and/or sensor data 122, from one or more of the devices.

For example, in non-limiting aspects, the TSN 128 can communicate data between or among the devices and control system 104 using a data distribution service (not shown). As will be understood, the data distribution service can be a network "middleware" application resident for example within the devices 118, 120, 124, and 126, and control system 104 that facilitates configuring publishers and subscribers on a network. In other aspects, other middleware applications can be used. In still other aspects, the data distribution service can be omitted, and the one or more software applications 111 can manage the installed product 102 (and its devices) without use of the data distribution service.

The data distribution service can represent an object management group (OMG) device-to-device middleware communication standard between the devices and the network. The data distribution service can allow communication between publishers and subscribers. The term publisher can refer to devices 118, 120, 124, and 126 that send data to other devices 118, 120, 124, 126 and the term subscriber refers to devices 118, 120, 124, and 126 that receive data from other devices 118, 120, 124, and 126. The data distribution service can operate on a variety of networks, such as Ethernet networks as one non-limiting example. The data distribution service can operate between the network through which data is communicated and the applications communicating the data (e.g., the devices 118, 120, 124, and 126). The devices 118, 120, 124, and 126 can publish and subscribe to data over a distributed area to permit a wide variety of information to be shared among the devices 118, 120, 124, and 126.

In one aspect, the data distribution service can be used by the devices 118, 120, 124, and 126 to communicate data 101, 103, 105, 107, 109, 122 through the TSN 128, which can operate on an Ethernet network of the installed product. The TSN 128 can be at least partially defined by a set of standards developed by the Time Sensitive Networking Task Group, and can include one or more of the IEEE 802.1 standards.

A TSN-based deterministic network, including but not limited to an Ethernet network, can dictate (i.e., schedule) when certain data communications occur to ensure that certain data frames or packets are communicated within designated time periods or at designated times. Data transmissions within such TSN-based Ethernet networks can be based on a global time or time scale of the network that can be the same for the devices in, or connected with, the network, with the times or time slots in which the devices communicate being scheduled for at least some of the devices.

For ease of description and understanding, the TSN 128 is depicted in FIG. 1 and described as a local area Ethernet network, but alternatively can be another type of network. For example, devices, including those associated with the system 100 and any other devices described herein, can exchange information via any TSN 128 which can be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a Wireless LAN network ("WLAN"), a cellular network (e.g. 5G network), or an Internet Protocol ("IP") network such as the Internet, an intranet, or an extranet. It is contemplated that any devices described herein can communicate via one or more such communication networks.

In various non-limiting aspects, the TSN 128 can include various types of physical media including copper, optical fiber, wires including Wi-Fi and 5G-RAN, and wave guide acoustical channels among many others.

In various aspects, the devices 118, 120, 124, 126 can communicate the data 122, 103, 101, 107, 105, 109 using the time sensitive network 128. As will be discussed in more detail herein, the TSN 128 can include communication links (not shown) communicatively coupling node devices. For example, in one non-limiting aspect, the devices 118, 120, 124, 126 can be the end node devices. In another non-limiting aspect, the TSN 128 can be configured to include the devices 118, 120, 124, 126 (e.g., communicatively coupled with each other via the communication links. The communication links are connections over or through which data flows, data packets, frames, datagrams or a combination thereof can be communicated between the node devices. The communication links can be wired or wireless connections between the node devices.

In aspects, the node devices can include routers, switches, repeaters, or other devices capable of receiving data frames or packets or sending the data frames or packets to another node device, or both. The data can be communicated in the TSN 128 as data frames or data packets. The data frames or packets can be published by a node device 118, 120, 124, 126 and received by another device 118, 120, 124, 126 according to a network or communication schedule. For example, one or more of the data frames or data packets can be published by the sensor 118 and sent to the TSN 128 can be subscribed to by the control system 104. The data frames or packets be transmitted as a data flow along a data transmission path defined by the communication links, from the sensor 118 to the control system 104 to the various node devices in accordance with the determined schedule.

Figure 2:
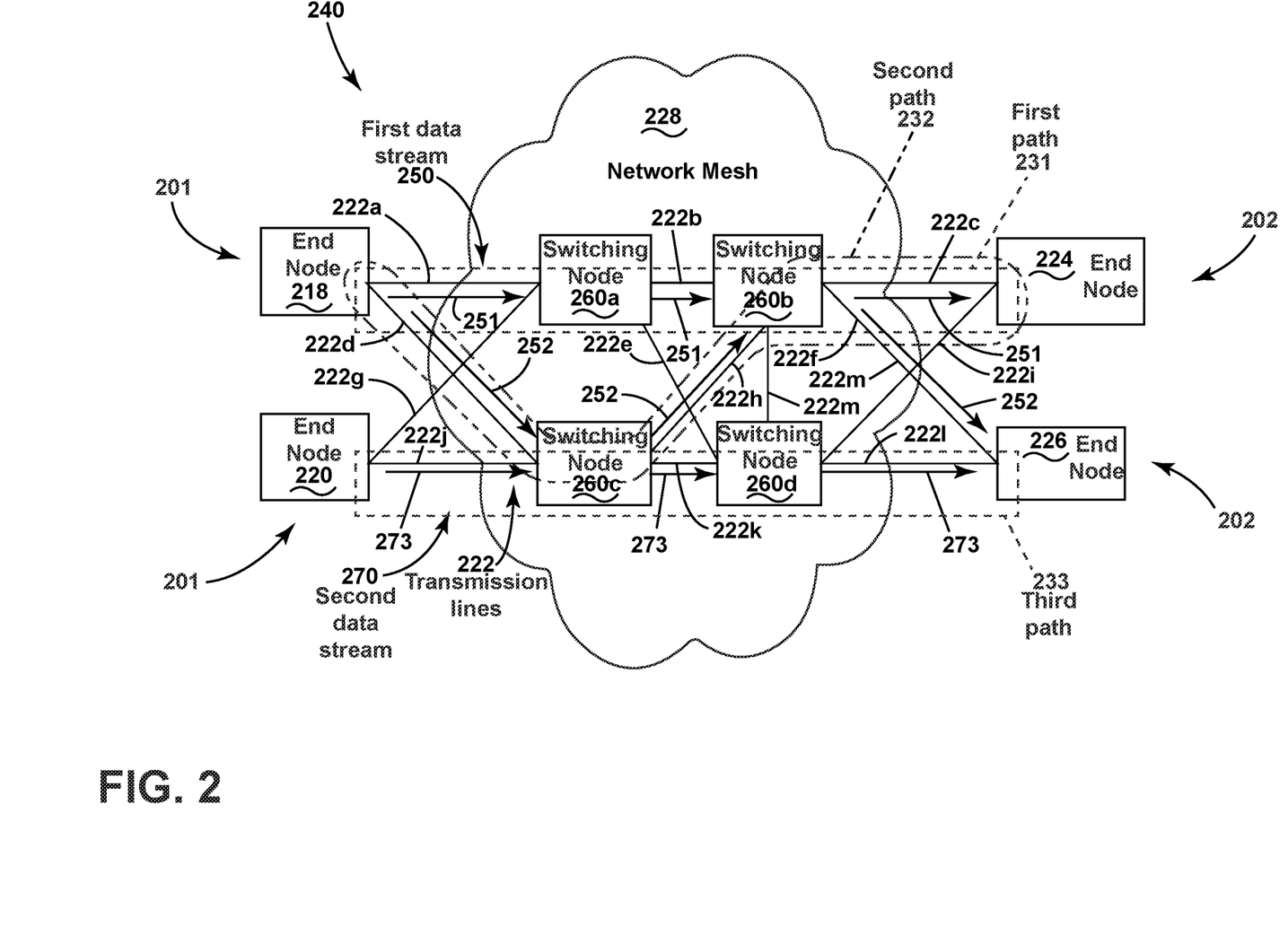
FIG. 2 illustrates a schematic diagram of a data network, having a set of data flows in accordance with aspects as described herein.

FIG. 2 illustrates a non-limiting schematic view of a simple data network 240, according to aspects of the disclosure. The data network 240 can include, but is not limited to, a set of devices or end nodes 218, 220, 224, 226, a set of network switching units or switching nodes 260 comprising respective switching nodes 260a, 260b, 260c, 260d, and a set of data transmission lines or links 222 comprising a number of respective links 222a-222m. The set of switching nodes 260 and the set of links 222 collectively define a network structure 228 for transmitting or routing data traffic (e.g., data frames) in data flows to and from the end nodes 218, 220, 224, 226, via the set of links 222 and the set of switching nodes 260. In aspects, the network structure 228 can include multiple links 222 between the network switching nodes 260 to provide redundancy in the links 222.

In non-limiting aspects, the data network 240 can enable a first data stream 250, and a second data stream 270. The first data stream 250 can comprise a first set of data flows 251, and a second set of data flows 252. The second data stream 270 can comprise a third set of data flows 273. The first, second, and third sets of data flows 251, 252, 273 can be scheduled to flow from a respective originating end node 201 to a respective destination end node 202 along a path defined by a respective subset of the set of links 222. In non-limiting aspects, each of the end nodes 218, 220 224, 226 can comprise the originating end node 201, or the destination end node 202, or a combination thereof. In aspects, the switching nodes 260a-260d can comprise routers, switches, bridges, repeaters, or other devices, or combinations thereof, capable of sending or receiving data to another node device, such as an end node 218, 220, 224, 226 or another switching node 260a-260d. The set of links 222 can comprise wired or wireless connections between the end nodes 218, 220, 224, 226 or switching nodes 260a-260d or combinations thereof. In one non-limiting example, the network structure 228, the set of switching nodes 260a-d, the end nodes 218, 220, 224, 226, and the set of links 222 can be arranged, configured, or otherwise enabled to utilize a TSN-based transmission schema.

Each node of the set of switching nodes 260a-d and the end nodes 218, 220, 224, 226, can be communicatively coupled with at least one of another switching node 260a-260d or end node 218, 220, 224, 226, via at least one link 222a-222m. That is, in aspects, each link 222 can communicatively couple a corresponding pair of nodes 218, 220, 224, 226, 260a-260d. Additionally, or alternatively, any number of the switching nodes 260a-260d can be communicatively coupled with at least one of an end node 218, 220, 224, 226 via one or more links 222a-222m. For example, as shown in the non-limiting aspect of FIG. 2, switching node 260a can be coupled to end nodes 218 and 220 via links 222a and 222j, respectively, and is further coupled to switching nodes 260b and 260d via links 222b and 222e, respectively. In this way, each end node 218, 220, 224, 226 can be communicatively coupled with at least one other end node 218, 220, 224, 226 via the set of links 222 and set of switching nodes 260.

For example, in the non-limiting aspect depicted in FIG. 2, the first set of data flows 251 is depicted as a first set of arrows indicative of a respective direction, arranged sequentially (from left to right in the Figure) to indicate a flow from an originating end node 201 (e.g., the end node 218) to a destination end node 202 (e.g., the end node 224) via a first path 231 defined by a sequential series of links 222a, 222b, 222c and switching nodes 260a, 260b. Additionally, as shown, the second set of data flows 252 is depicted as a second set of arrows 252 indicative of a respective direction, arranged sequentially (from left to right) to indicate a flow from the end node 218 to end node 226 via a second path 232 defined by a sequential series of links 222d, 222h, 222f and switching nodes 260c, 260b. As shown, the third set of data flows 273 is depicted as a third set of arrows 273 indicative of a respective direction, arranged sequentially (from left to right) to indicate a flow from the end node 220 to end node 226 via a third path 233 defined by series of links 222j, 222k, 222l and switching nodes 260c, 260d. The data flows of the first, second, and third sets of data flows 251, 252, 273 can be independently scheduled and transmitted at various respective times. Each data flow 251, 252, 273 of the first, second, and third set of data flows 251, 252, 273 can be scheduled for transmission and subsequently transmitted in accordance with their respective schedules.

It will be understood that while the first second and third sets of data flows 251, 252, 273 are depicted, for ease of description and understanding, as transmitted concurrently or simultaneously, such a simultaneous transmission of data flows should not be inferred. It will be appreciated that the aspect of the disclosure illustrated in FIG. 2 is merely one simple representation of the data network 240, and alternative topologies, configurations, organization, and quantities of the end nodes 218, 220, 224, 226, switching nodes 260, and links 222 are envisioned. Additionally, it will be appreciated that the data flows depicted are by way of example only, and aspects can comprise any number of data streams having any number of data flows having any number of paths without departing from the scope of the disclosure herein.

Figure 3:
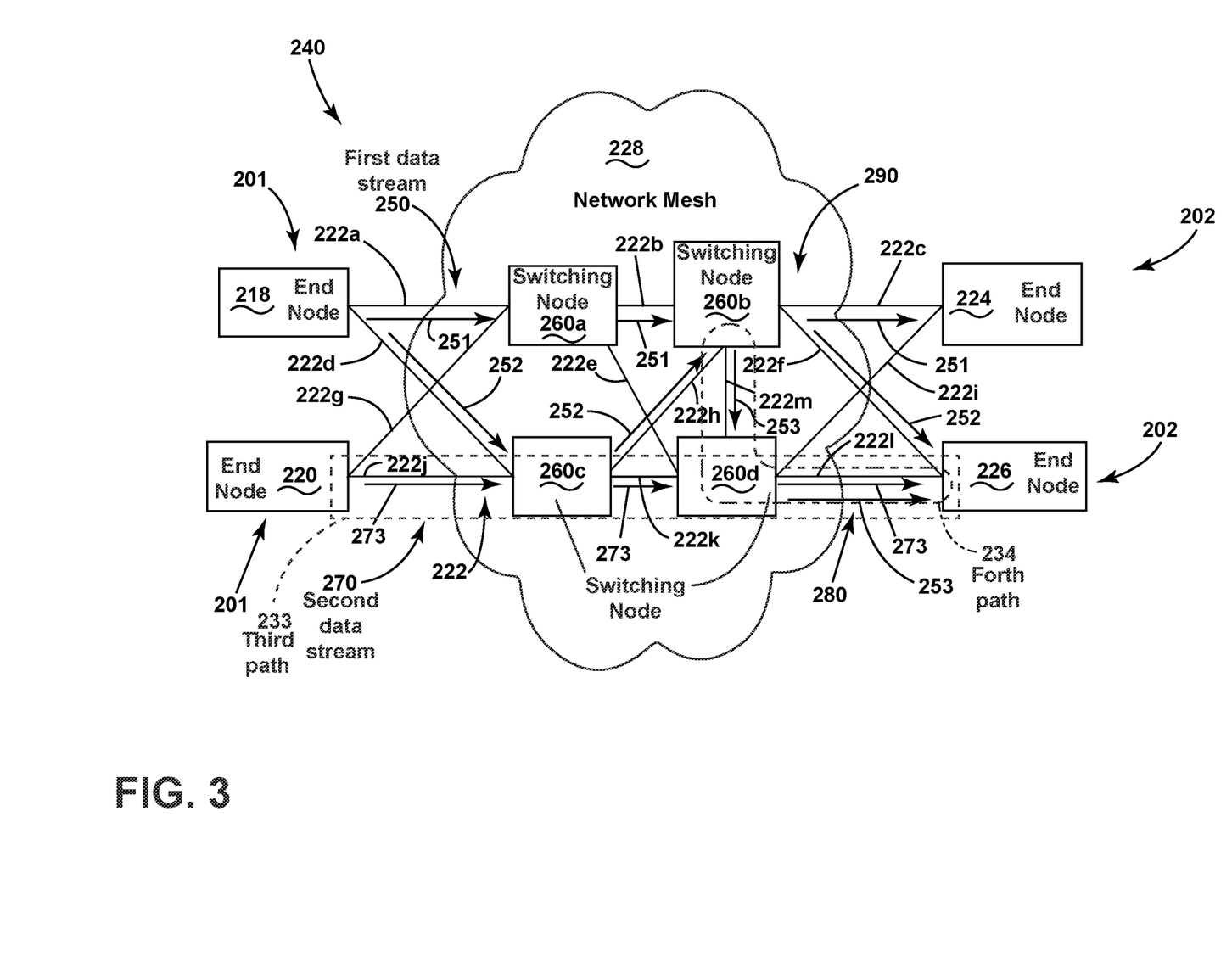
FIG. 3 illustrates a variant of the data network of FIG. 2 in accordance with aspects as described herein.

FIG. 3 illustrates a variant of the schematic view of the data network 240 of FIG. 2, therefore, like parts in the variant are identified with the same reference numbers as in FIG. 2. As shown, in the non-limiting aspect depicted in FIG. 3, the data network 240 can further comprise a fourth set of data flows 253 (i.e., in addition to the first, second, and third set of data flows 251, 252, 273). As shown, the fourth set of data flows 253 is depicted by arrows 253 indicative of a direction, and arranged sequentially to indicate a flow from the switching node 260b to end node 226 via a fourth path 234 defined by links 222m, 222l, and switching node 260d, 260b respectively. As can be seen, the data flow 254 is arranged to flow on a common link 222l, with a data flow 273 of the third set of data flows 273. In the event the data flow 253 and the data flow 273 are scheduled to flow on the common link 222l at the same time, then a conflict can be determined to exist. As used herein, the term "conflict" refers to a calculation, indication, identification, anticipation, estimation, or other determination, that two or more data flows would or could be present on a common link at the same time. In aspects, the data flows of the first, second, and third set of data flows 251, 252, 273 that correspond to a determined conflict can define at least a first subset of data flows 280. Similarly, in aspects, the data flows of the first, second, and third set of data flows 251, 252, 273 that do not correspond to a determined conflict can define at least a second subset of data flows 290. For example, with continued reference to FIG. 3, in the event the data flows 254 of the fourth set of data flows 254, and the data flow 273 of the third set of data flows 273 illustrated on the link 222l are arranged to flow on the common link 222l, at the same time, a conflict would be determined and the corresponding data flows 254, 273 can define the first subset of data flows 280. Similarly, the data flows of the first, second, and third set of data flows 251, 252, 273 that do not correspond to a determined conflict can define the second subset of data flows 290.

Figure 4:
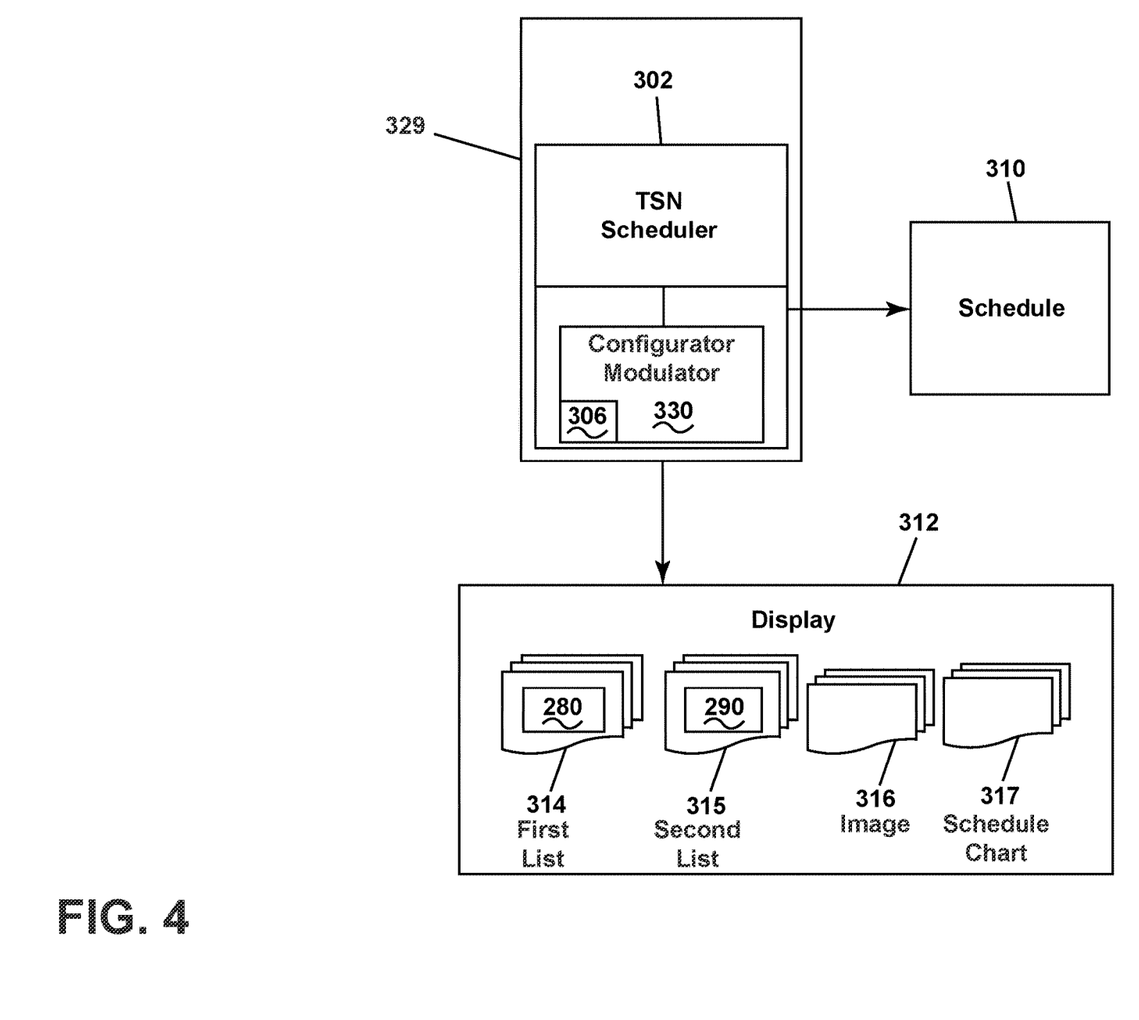
FIG. 4 illustrates a schematic block diagram of a portion of the system of FIG. 1, in accordance with aspects as described herein.

Turning to FIG. 4, a block diagram is provided of an example of an operation of a portion of the system 100 of FIG. 1 in accordance with various aspects of the disclosure. The system 100 can comprise a network scheduler 329. The network scheduler can comprise a scheduler module 302. The scheduler module 302 can be configured to schedule data traffic (e.g., a data flow). In non-limiting aspects the network scheduler 329 can further include a configurator module 330. The configurator module can be configured to determine a set of data flow requirements 306. For example, in an aspect, the data flow requirements 306 can include a data frame size, interval, and the earliest or latest time by which a data frame associated with particular data flow 251, 252, 273 must be transmitted in a given cycle or interval. In aspects, the data flow requirements 306 can include a classification of the data flow 251, 252, 273. In some aspects, the configurator module 330, in conjunction with scheduler module 302, can cooperatively calculate, define, or otherwise determine other parameters such as ingress policing rules, data frame replication and traffic shaping parameters.

In non-limiting aspects, the data traffic or data flow transmissions in the TSN 128 can include data packets comprising one or more data frames (not shown) or portions thereof. The data frames can be received by the control system 104 at a switch node (not shown) and provided to the scheduler module 302. The data frames can be standardized as desired. For example, the data frame can include a header that include a destination address, a source address and an Ethernet type. The data frame can also include other data (e.g., a payload) as desired.

The scheduler module 302 can be configured to generate a schedule 310 for transmission of the data frames from device 118, 120, 124, 126 connected to TSN 128. In a non-limiting aspect, the network scheduler 329 can receive the network topology description and data flow requirements 306 from the data store 110, an application (not shown), or any other suitable source. In other aspects the network scheduler 129 can be configured to determine with the configurator module 330 the network topology description and data flow requirements 306. In non-liming aspects, the network topology description and data flow requirements 306 can include, for example, an indication of time sensitive links, maximum allowable latencies, link bandwidths, data frame sizes("payload"), data frame destinations, band allocation gaps, data flow classifications, and combinations thereof. Additionally, the network scheduler 329 can be communicatively coupled to a display device 312 and arranged to provide information in visual or auditory format, or both, via the display device 312. In non-limiting aspects, the display can be configured to provide information received from the scheduler module 302 in the form of a first list 314 comprising the first subset of the set of data flows 280, a second list 315 comprising the second subset of data flows 290, a map or image 316 of data flows 251, 252, 273, a data transmission schedule display or chart 317 of data flows 251, 252, 273, or various combinations thereof. In an aspect, the display device 312 can comprise a display device, a touchscreen, laptop, tablet computer, mobile phone, haptic device, or other device that communicates or conveys information to a user or operator. In an aspect, the display device 312 can be located remote from the scheduler module 302.

In aspects, the network scheduler 329 can communicate with the set of switching nodes 260 and end systems (e.g., devices 118, 120, 124, 126 of the installed product 102) to configure them for operation in accordance with the determined schedule 310.

The scheduler module 302 can be configured to generate a schedule 310 for a transmission of data flows 251, 252, 273 in TSN 128. In an aspect, network scheduler 329 can use a communication protocol (e.g. NETCONF) to programmatically send or communicate the schedule 120 to a device over the network 128. In other aspects, the schedule 310 can be provided in desired format (e.g. binary) and loaded on to the devices by another method (e.g. manually).

In some aspects, the schedule 310 for transmission of data flows for a data flow 251, 252, 273 can include a specific transmission information for the data flow 251, 252, 273 with respect to a respective node. The transmission information can include temporal information for the transmission of the data flow 251, 252, 273. In one or more aspects, the schedule 310 for a transmission of the data flow 251, 252, 273 can include a transmission start time. For example, the transmission start time can be the time at which the transmission of the data flow 251, 252, 273 from the respective node initiates. In an aspect, the transmission of the data flow 251, 252, 273 can be initiated by a selective opening of a gate corresponding to a respective queue in the respective node (not shown) to transmit the data frame 304, as a data flow to a destination node. Conversely, the transmission of the data flow 251, 252, 273 can be ceased or prevented by a selective closing of the gate corresponding to the respective queue in the respective node to transmit the data flow 251, 252, 273. The network scheduler 329 can define or assign a specific path or link 222a-m communicatively coupling the respective node and another node to transmit the data flow 251, 252, 273 thereon. The planned or executed transmission of a particular data flow 251, 252, 273 on a specific path or link 222a-m from the respective node to another node at a specific time can define the schedule 310 for a respective data flow 251, 252, 273. Additionally, the schedule 310 can define a duration of the transmission of the respective data flow 251, 252, 273 on the respective link 222*a-m*. In an aspect, the duration of the data flow 251, 252, 273 transmission on the respective link 222*a-m* can be defined by a time period between the selective opening of the gate (i.e., to transmit the data flow 251, 252, 273) and the selective closing of the gate of the respective node (i.e., to cease transmission of the data flow 251, 252, 273 to the destination node). The schedule 310 can further include or define other parameters based on the data flow requirements 306 provided to the scheduler module 302. For example, in non-limiting aspects, the parameters can include a cycle time, (i.e., a period, or interval over which the transmission schedule is to be repeated), an offset (i.e., time from the start of a cycle at which a transmission is to begins, or a duration (i.e., an elapsed time after a transmission begins for the transmission to end).

As will be understood, the scheduler module 302 can be configured to select or determine the respective link 222*a-m* for each respective data flow 251, 252, 273 based on the data flow requirements 306 provided to the scheduler module 302, and to avoid contention or conflicts with other data flows 251, 252, 273. More specifically, the scheduler module 302 can be configured to schedule all data flows 251, 252, 273 (i.e., the transmission of all data frames on the set of links 222) and to avoid a conflict between any two or more data flows 251, 252, 273 on any link 222*a-m*. The scheduler module 302 can employ various algorithms to programmatically assign specific time slots for each data flow 251, 252, 273 transmission in such a way that no two data flow 251, 252, 273 transmissions occur on the same link at the same time, thereby effectively spreading out the transmissions over time to eliminate or avoid conflicts. However, it may not always be feasible to produce such a solution. For example, if the data flow 251, 252, 273 requirements and the selected respective paths 231, 232, 233 for those flows result in a total bandwidth that exceeds the bandwidth of one of more links 222*a-m* in those paths 231, 232, 233. In those aspects, the scheduler module 302 can be prevented from scheduling a particular data flow 251, 252, 273 that would result in such a conflict. That is, in non-limiting aspects, the scheduler module 302 can be prevented from scheduling a particular data flow 251, 252, 273 on a particular link 222*a-m* at a particular time, in the event it is determined that such a schedule would result in a conflict. For example, in an instance, the scheduler module 302 can schedule a particular data flow, 251, 252, 273 on a particular link 222*a-m* at a particular time, and subsequently determine another unscheduled data flow would, if scheduled in accordance with the data flow requirements 306, be in conflict with the scheduled particular data flow 251, 252, 273.

In some instances, for example in a complex network with a large number of end nodes 218, 220, 224, 226 and data flows 251, 252, 273, the network topology or data flow requirements 306 can result in a determination by the scheduler module 302 of a conflict for one or more data flows 251, 252, 273 on a particular link 222*a-m* at a particular time. In the event a conflict is determined or identified for one or more data flows 251, 252, 273 on one more links 222*a-m*, at one or more times, the scheduler module 302 can be prevented from scheduling the one or more data flows 251, 252, 273 having the conflict. Such conflicting data flows can define the first subset of data flows 280. In aspects, the network scheduler 329 can be configured to provide the first list 314 or other indication of the first subset of data flows 280. The first list 314 can include identifying information for the first subset of data flows 280, the links 222*a-m* on which the conflict occurs, and temporal information associated with the conflict corresponding to the unscheduled (i.e., conflicting) data flows of the first subset of data flows 280. The scheduler module 302 can additionally or alternatively be configured to determine that those data flows 251, 252, 273 without a determined conflict (i.e., defining the second subset of data flows 290), are schedulable. In such aspects, the network scheduler 329 can be configured to provide the second list 315 or other indication of the second subset of data flows 290. The second list 315 can include identifying information for the second subset of data flows 290, links 222*a-m*, and temporal information corresponding to the schedulable (i.e., non-conflicting) data flows. In some aspects, the network scheduler 329 can provide the first list 314 and the second list 315 to the display device 312.

In some aspects, the scheduler module 302 can additionally or alternatively be configured to determine a network latency of the scheduled data flows 251, 252, 273. For example, the network latency can be determined based on the transmission schedule 310 for transmission of data flows 251, 252, 273 along their respective transmission paths 231, 232, 233. In a non-limiting aspect, the network latency of a particular data flow 251, 252, 273 can be defined as the time between the start of a data frame transmission from an originating end node 220 on the first sequential link in the respective path 231, 232, 233 and the reception of that data frame at a destination end node 226 via the last sequential link in the path 231, 232, 233. In some aspects, the network scheduler 329 can provide a signal indicative of the network latency for the scheduled data flows 251, 252, 273 to the display device 312.

In an aspect, the network scheduler 329 can additionally or alternatively be configured to provide information to the display device 312 to cause an image indicative of a flow display or map 316 for one or more data streams 250, 270 or a portion thereof. In an aspect the image 316 can comprise a flow display or map 316. The image 316 can be provided in visual format on the display device 312. For example, the image 316 can comprise a schematic flow diagram or map. In other aspects, the image 316 can depict a flow diagram overlayed or superimposed over a schematic depiction of the physical topology of the network 240 or a portion thereof.

Figure 5:
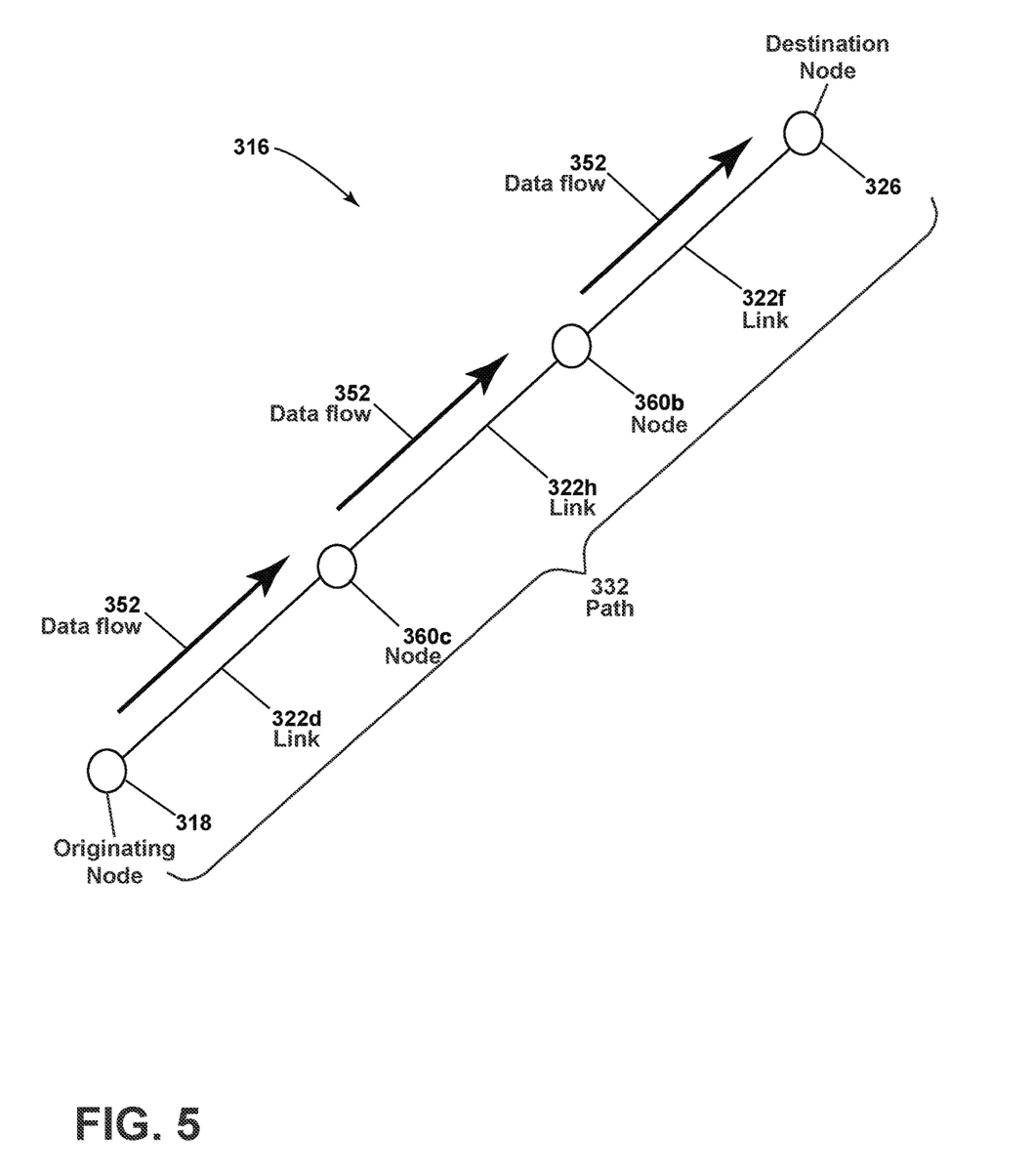
FIG. 5 illustrates a flow map for a portion of the data network of FIG. 2, in accordance with aspects as described herein.

For example, FIG. 5 illustrates a non-limiting aspect of an image 316 for a portion of the data network 240 of FIG. 2. Accordingly, like parts in the image 316 of FIG. 5 are identified with the same reference numbers as in FIG. 2, incremented by 100. While FIG. 5 depicts only a single path 332, for ease of description and understanding, other aspects are not so limited and can include any desired number of paths for any desired portion of the data network 240. In aspects, the image 316 can include graphical information indicating each respective link 322*a-m* and the corresponding pair of nodes (i.e. coupled to the respective link 222*a-m*), associated with each data flow 251, 252, 273 of the network 240 or a portion thereof. Additionally, the image 316 can display a data flow transmission direction or sequential order of each respective data flow 251, 252, 273 transmission through the network 240. As illustrated in FIG. 5, the image 316 of the portion of data network 240 includes, for each data flow (indicated by arrows, 352) of the second set of data flows 352, a topographic representation of the respective links 322*d*, 322*h*, 322*f* for portion of data network 240 and the corresponding pairs of nodes (318-360*c*; 360*c*-360*b*; and 360*b*-326) communicatively coupled to the respective links 322d, 322h, 322f. At least some of the respective links 322d, 322h, 322f can define a respective path 332 from a first originating node 318 to a second destination node 326.

Figure 6:
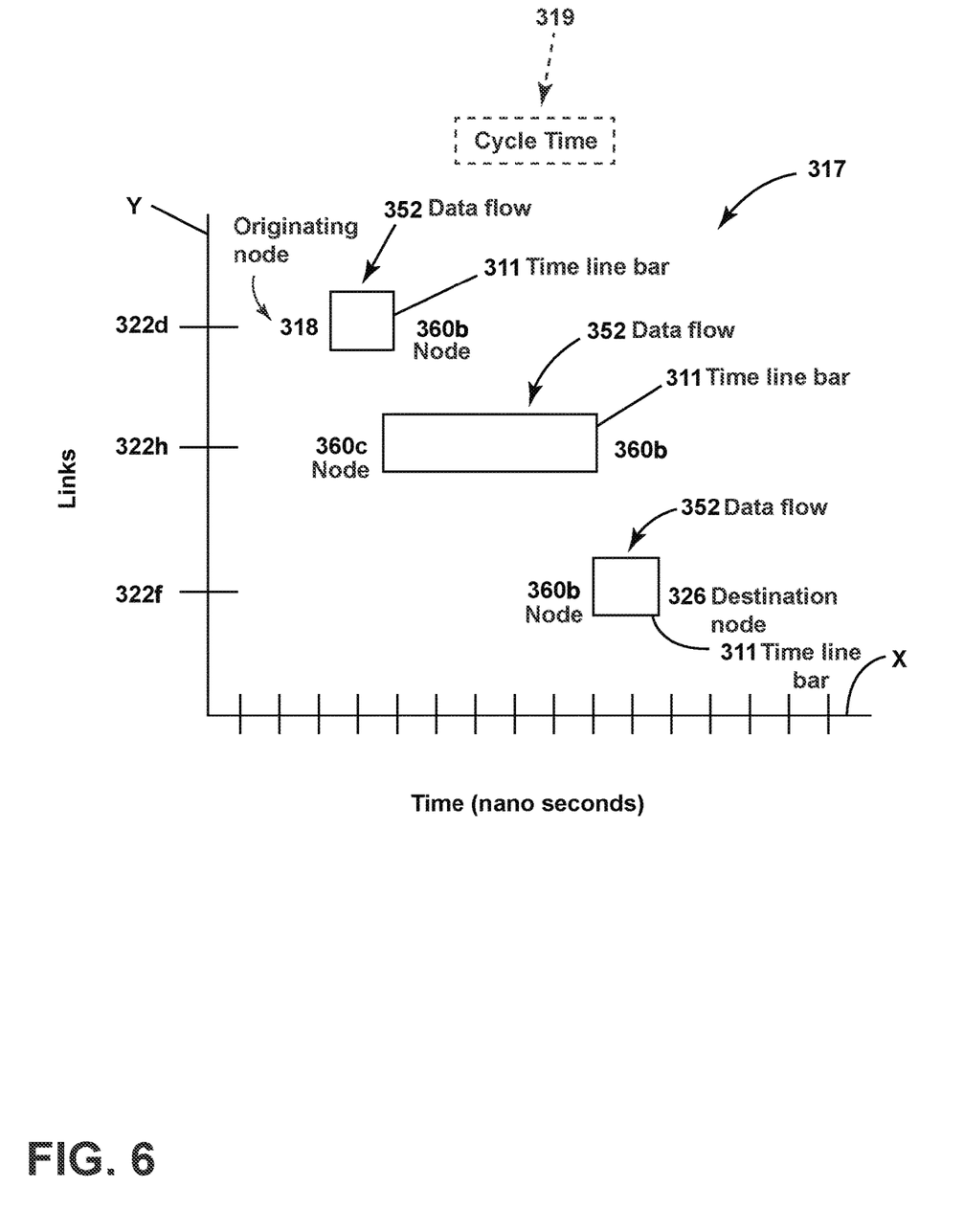
FIG. 6 illustrates a data transmission schedule for a portion of the data network of FIG. 2, in accordance with aspects as described herein.

FIG. 6 illustrates a non-limiting example of an aspect of a data transmission schedule chart 317 corresponding to the image 316 of the portion of network 240 of FIG. 5, therefore, like parts in FIG. 6 are identified with the same reference numbers as in FIG. 5.

In an aspect, the network scheduler 329 can additionally or alternatively be configured to provide a graphic display of a data transmission schedule chart 317 for the data network 240 or a portion thereof. In aspects, the data transmission schedule chart 317 can be depicted on the display device 312. Additionally, or alternatively, information indicative of a cycle time 319 for the data network 240 can be depicted on the display device 312. The data transmission schedule chart 317 for network 240 or portion thereof can provide a user with a visual representation of all or a portion of the sequential transmissions of data flows between a set of communicatively coupled end nodes with respect to time. The data transmission schedule chart 317 can include or display information indicative of each respective data flow 352 transmission. The data transmission schedule chart 317 can include or display information indicative of a start time and a duration of each respective data flow 352 transmission with respect to each link 322d, 322h, 322f in the path 332 defined by the links 322d, 322h, 322f. In aspects, the data transmission schedule chart 317 can include or display information indicative of at least one of the corresponding pair of nodes for each link 322d, 322h, 322f. In non-limiting aspects the transmission schedule chart 317 can be displayed in the form of a waterfall chart.

A waterfall chart is a visual tool that can be utilized as disclosed herein to analyze network schedules and resolve conflicts. Waterfall charts or diagrams can allow a user to visualize data that is generated cumulatively or sequentially to depict a data flow. A waterfall chart for network 240 or portion thereof can provide the user with a visual representation of all or a portion of the sequential transmission of data flows between a set of communicatively coupled end nodes with respect to time.

In aspects, the waterfall chart can consist of a series of vertically arranged bars that extend horizontally across a timeline or time-axis. Each of the bars can represent a particular instance of a data flow transmission between a pair of communicatively coupled nodes. The bars can be depicted in a vertically-arranged sequence indicative of a step-by-step sequence of the data transmissions through the network 240 as the associated data frame is delivered to the intended end node destination.

For example, as depicted in FIG. 6, the data transmission schedule chart 317 can comprise a waterfall chart including a horizontal axis, "X", representative of time (e.g., nanoseconds), and a vertical axis, "Y" indicative of each link 322d, 322h, 322f associated with a particular data flow 352. The data transmission schedule chart 317 can further include a set of timeline bars 311. Each timeline bar 311 can represent a respective data flow 352 on a particular link 322d, 322h, 322f between a pair of nodes 318, 360c, 360b, 326 at a particular time. Each timeline bar 311 can graphically indicate temporal information for each data flow 352. For example, each time line bar 311 can indicate, with reference to the X-axis, a specified start time for a data flow 352 transmission, and a specified end time for the data flow 352 transmission. Additionally, or alternatively, the time line bar 311 can indicate a duration of the data flow 352 transmission (e.g., the longer the time duration, the longer the time line bar 311) on the link 322d, 322h, 322f. Additionally, or alternatively, for each respective data flow 252 represented by a respective time line bar 311, the data transmission schedule chart 317 can include an indication of the communicatively coupled nodes, for example, an originating or starting node and a destination node for the data flow 352.

Additionally, or alternatively, the scheduler module 302 can display or cause to be displayed, a visual indication of the schedulable data flows, and temporal information corresponding to each schedulable data flow of the network 240 or a portion thereof. For example, for the portion of the network 240 depicted in FIG. 5, the scheduler module 302 can display, for a schedulable data flow on a respective link 222 (i.e., between two nodes 218, 220, 224, 226, 260), a scheduled start time of a data flow transmission and the duration of the data flow transmission. In an aspect, the scheduler module 302 can display the temporal information for each data flow on each successive link 222a-m from a source or originating end node 201 to a destination end node 202. In an aspect, the network scheduler 329 can display the period or cycle time 319 for the network 240.

Figure 7:
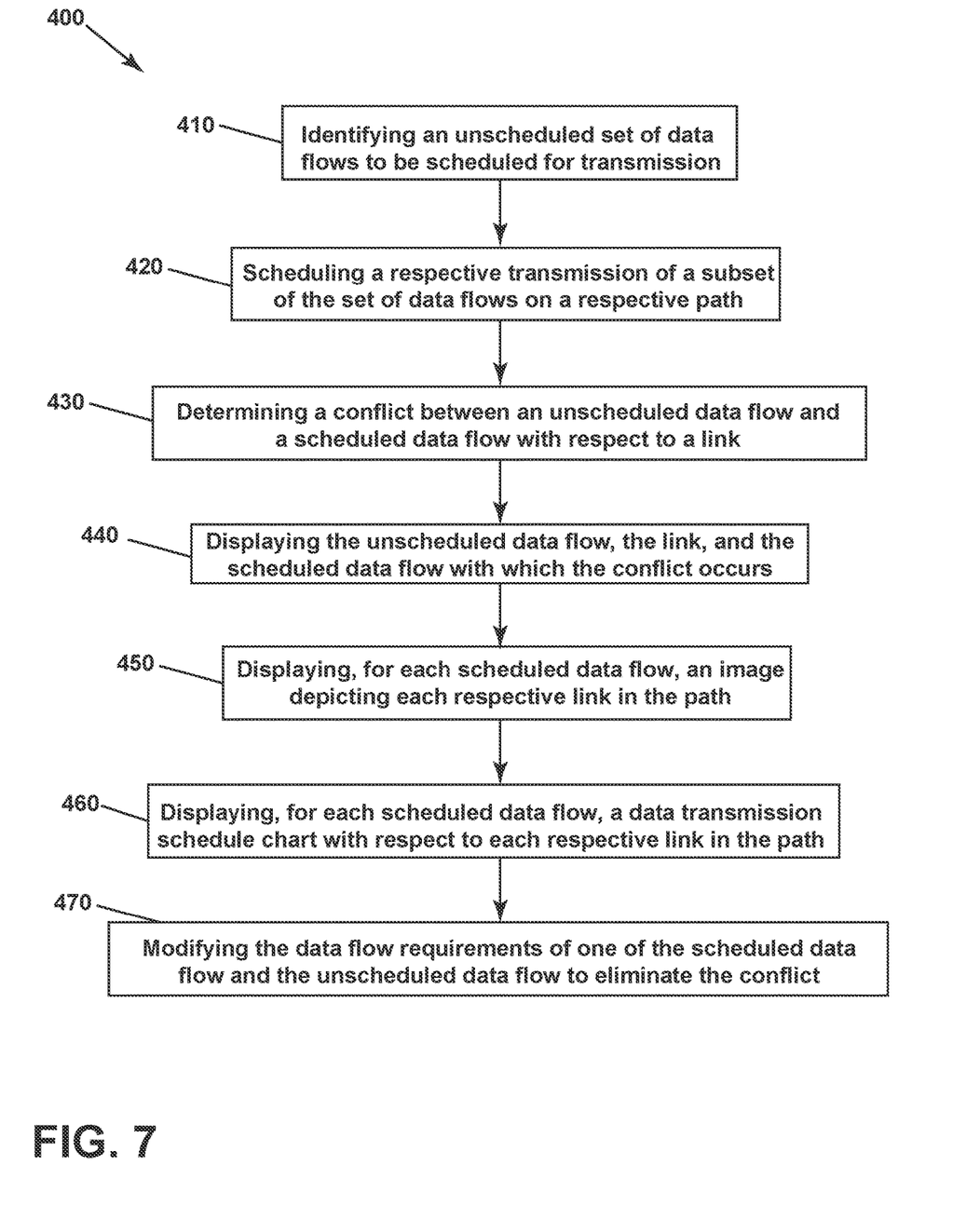
FIG. 7 illustrates a process flow diagram of a method if scheduling a transmission of data, in accordance with aspects as described herein.

FIG. 7 provides a flow diagram of a method 400, according to an aspect. Method 400, and any other process described herein, can be performed using any suitable combination of hardware (e.g., circuit(s)), software or manual means. For example, a computer-readable storage medium can store thereon instructions that when executed by a machine result in performance according to any of the aspects described herein. In one or more aspects, the system 100 is conditioned to perform the method 400 such that the system is a special-purpose element configured to perform operations not performable by a general-purpose computer or device. Software embodying these processes can be stored by any non-transitory tangible medium including a fixed disk, a floppy disk, a CD, a DVD, a Flash drive, or a magnetic tape. Examples of these processes will be described below, with respect to aspects of the system 100, but other aspects are not so limited.

The method 400 can include scheduling a transmission of a set of data flows corresponding to a network topology. The network can comprise a set of nodes communicatively coupled by a set of links, each link coupling a corresponding pair of nodes. In various aspects, each data flow can correspond to the network topology, based on the respective raw data for the network topology. In an aspect, the set of data flows can be determined by the control system 104. In other aspects, the set of data flows can be determined by a separate computing device and provided to the control system 104 to be saved in the data store 110. The schedule can provide a transmission schedule for a set of data flows on one or more respective links 222a-m of a network 240 or a portion thereof, at a particular respective time. In one or more aspects, the schedule 210 can be based on the network topology description and data flow requirements 306.

The method 400 can comprise identifying an unscheduled set of data flows to be scheduled for a respective transmission on a subset of the set of links 322, at 410. In aspects, the subset of the set of links 322 can define a respective path 332 from a first originating node 318 to a second destination node 326. The method 400 can also include scheduling a respective transmission of a subset of the data flows on the respective path 332, at 420, wherein the schedule defines a start time and a duration of the transmission on each respective link 322d, 322h, 322f on the path 332. The method 400 can further include determining a conflict between an unscheduled data flow and a scheduled data flow with respect to a link of the set of links, at 430, and displaying information indicative of the unscheduled data flow and the scheduled data flow with which the determined conflict occurs, at 440. The displayed information can further include any desired additional information indicative of the scheduled data flow that is in conflict with the unscheduled data flow. Next, the method 400 can comprise displaying, for each scheduled data flow, an image 316 depicting each respective link 322d, 322h, 322f of the path 332 at 450, and displaying, for each scheduled data flow, a data transmission schedule with respect to each respective link 322d, 322h, 322f in the path 332, at 460.

The image 316 depicting each respective link 322d, 322h, 322f of the path 332 can include a map depicting each respective link 322d, 322h, 322f of the path 332. Additionally, or alternatively, the image 316 can include a graphic display of the corresponding a pair of nodes 218, 22, 224, 226, 260a-260d communicatively coupled to the respective links 222a-m. In other aspects, the image 316 can be further depicted overlaying an image or diagram representative of a physical topology of the network 240 or a portion thereof. The image 316 depicting each respective link 322d, 322h, 322f of the path 332 can further include a visual indication of the relative direction of the data flow.

The data transmission schedule with respect to each respective link 322d, 322h, 322f in the path can include temporal information for the data flow 251, 252, 273 transmissions corresponding to each respective link 222a-m associated with the data flows 251, 252, 273. In aspects, the temporal information for the data flow 251, 252, 273 transmissions can include without limitation, one or more of a start time, a stop time, a duration of a transmission, or a combination thereof, on each respective link 222a-m. Additionally, or alternatively, information indicative of a cycle time 319 or a network latency, or both, associated with the data flow 251, 252, 273 transmissions can be depicted on the display device. In an aspect, the displaying the data transmission schedule can include a separate or distinct entry for each of the link 222a-m in a data transmission path for the respective data flow 251, 252, 273. In some non-limiting aspects, the display of data transmission schedule can be in the form of a waterfall chart 600. In aspects the displaying data transmission schedule can include displaying an identification or description of the corresponding pair of nodes 218, 220, 224, 226, 260a-260d communicatively coupled to the respective links 222a-m.

The method can further include, at 470, modifying data flow requirements 306 of at least one of the scheduled data flow and the unscheduled data flow to eliminate the conflict. The modifying the data flow requirements can include modifying at least one of a data frame size, interval, cycle time, relative timing of the flow (e.g. start time) and a duration of the data flow transmission. In aspects, the modifying the data flow requirements can also include modifying a classification of the data flow. In some aspects, the modification of a data flow requirements can be based on the network latency of the scheduled data flows 251, 252, 273. For example, in a non-limiting aspect, the data flow requirements can be modified to achieve a lower network latency on scheduled data flows 251, 252, 273. In non-limiting aspects, the modifying data flow requirements 306 of at least one of the scheduled data flow and the unscheduled data flow to eliminate the conflict can be done by, or based on inputs from a user. In other aspects, the modifying the data flow requirements 306 can be done by the network scheduler 129, or the control system 104, or both, based on predetermined parameters.

In one or more aspects, the schedule 310 can be downloaded onto all of the devices 118, 120, 124, and 126 and switches in the TSN 128. The schedule 310 can be executed i.e., the one or more data frames transmitted through the TSN 128, based on the schedule 210, at 322. One or more operations of the installed product 102 can be controlled based on the transmitted data frames 204, at 324.

The sequences depicted are for illustrative purposes only and is not meant to limit the method 400 in any way as it is understood that the portions of the method can proceed in a different logical order, additional or intervening portions can be included, or described portions of the method can be divided into multiple portions, or described portions of the method can be omitted without detracting from the described method.

Many other possible aspects and configurations in addition to that shown in the above figures are contemplated by the present disclosure. The aspects disclosed herein provide a system and method for scheduling data flows in time sensitive networks. A technical effect is that the above described aspects enable the efficient scheduling of data flows in time sensitive networks. One advantage that can be realized in the above aspects is that the time required to determine a schedule for a time sensitive network can be reduced.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects and advantages of the present disclosure can also be embodied in any permutation of aspects of the disclosure, including but not limited to the following technical solutions as defined in the enumerated aspects:

A method of scheduling a transmission of data flows in a network comprising a set of nodes communicatively coupled by a set of links, each link coupling a corresponding pair of nodes, the method comprising: identifying an unscheduled set of data flows to be scheduled for a respective transmission on a subset of the set of links defining a respective path from a first originating node to a second destination node; scheduling a respective transmission of a subset of data flows on a respective path, wherein the schedule defines a start time, a duration, and a cycle time of the transmission on each respective link in the path; determining a conflict between an unscheduled data flow and a scheduled data flow with respect to a link in the path; displaying information indicative of the unscheduled data flow, the link, and the scheduled data flow with which the conflict occurs; and displaying, for each scheduled data flow, an image depicting each respective link of the path, and a data transmission schedule chart with respect to each respective link in the path.

The method of the preceding clause, wherein the image depicting each respective link of the path is further depicted overlaying an image representative of a physical topology of the network.

The method of any preceding clause, wherein the image depicting each respective link of the path further includes a visual indication of a direction of the data flow.

The method of any preceding clause, wherein the displaying the data transmission schedule includes displaying a start time, a duration, and a cycle time of the data flow with respect to each link in the link path.

The method of any preceding clause, wherein the displaying the data transmission schedule includes displaying an element for each link in the path.

The method of any preceding clause, wherein the displaying the data transmission schedule includes displaying a label indicative of at least one of the corresponding pair of nodes for each link.

The method of any preceding clause, wherein the displaying the data transmission schedule includes displaying a waterfall chart.

The method of any preceding clause, further comprising modifying data flow requirements of at least one of the scheduled flow and the unscheduled flow to eliminate the conflict.

The method of any preceding clause, wherein the modifying data flow requirements of at least one of the scheduled flow and the unscheduled flow to eliminate the conflict is based on inputs received from a user.

The method of any preceding clause, wherein the modifying the data flow requirements includes modifying at least one of a frame size, an interval, a classification, and a relative timing of the data flow with respect to the link in the path.

A data communication network comprising: a set of nodes communicatively coupled by a set of links, each link coupling a corresponding pair of nodes; a display device; a scheduler module communicatively coupled to the display device, the scheduler module configured to: identify an unscheduled set of data flows to be scheduled for a respective transmission on a subset of the set of links, the subset of the set of links defining a respective path from a first originating node to a second destination node; define a schedule for a respective transmission of a subset of the set of data flows on a respective path, wherein the schedule includes a start time, a duration, and a cycle time of the transmission with respect to each respective link on the path; determine a conflict between an unscheduled data flow and a scheduled data flow with respect to a link in the path; provide information indicative of the unscheduled data flow, the first link, and the scheduled flow with which the conflict occurs, to the display device; wherein the display device is configured to display, for each scheduled data flow, an image depicting each respective link of the path, and to display, for each scheduled data flow, a transmission schedule chart with respect to each respective link in the path.

The data communication network of any preceding clause, wherein the image depicting each respective link of the path is further depicted overlaying an image representative of a physical topology of the network.

The data communication network of any preceding clause, wherein the image depicting each respective link of the path further includes a visual indication of a direction of the data flow.

The data communication network of any preceding clause, wherein the display of the data transmission schedule includes a start time, a duration, and a cycle time of the data flow with respect to each link in the path.

The data communication network of any preceding clause, wherein the display of the data transmission schedule includes an element for each link in the path.

The data communication network of any preceding clause, wherein the display of the data transmission schedule includes a label indicative of at least one of the corresponding pair of nodes for each link.

The data communication network of any preceding clause, wherein the display of the data transmission schedule comprises a waterfall chart.

The data communication network of any preceding clause, wherein the scheduler module is further configured to modify data flow requirements of at least one of the scheduled flow and the unscheduled flow to eliminate the conflict.

The method of any preceding clause, wherein the scheduler module is configured to modify the data flow requirements of at least one of the scheduled flow and the unscheduled flow to eliminate the conflict based on inputs received from a user.

The data communication network of any preceding clause, wherein the scheduler module is further configured to modify at least one of a at least one of frame size, interval, a classification, and a relative timing of the data flow with respect to the link in the path.

What is claimed is:

1. A method of scheduling a transmission of data flows in a time sensitive network (TSN) comprising a set of nodes, each node having at least a respective transmission queue and a corresponding gate, the set of nodes communicatively coupled by a set of links, each link coupling a corresponding pair of nodes, the method comprising:
    identifying an unscheduled set of data flows to be scheduled for a respective transmission in accordance with a TSN schema on a subset of the set of links defining a respective path from a first originating node to a second destination node;
    scheduling a respective transmission of a subset of data flows on the respective path, wherein the schedule defines a start time, a duration, and a cycle time of the transmission on each respective link in the respective path;
    determining a transmission queue and a corresponding gate at each respective node along the respective path for the respective transmission of the subset of data flows;
    operating the corresponding gate at each node along the respective path according to the schedule;
    displaying, for each scheduled data flow, a first image depicting each respective link in the path including a visual indication of a direction of the scheduled data flow on each respective link in the respective path, the first image overlaying a second image representative of a physical topology of the network, and a data transmission schedule chart with respect to each respective link in the respective path;
    determining a conflict between a scheduled data flow and an unscheduled data flow of the unscheduled set of data flows with respect to a link in the respective path; and modifying data flow requirements of at least one of the scheduled flow and the unscheduled flow to eliminate the conflict.

2. The method of claim 1, wherein the displaying the data transmission schedule includes displaying a start time, a duration, and a cycle time of the data flow with respect to each link in the respective path.

3. The method of claim 1, wherein the displaying the data transmission schedule includes displaying an element for each link in the respective path.

4. The method of claim 1, wherein the displaying the data transmission schedule includes displaying a label indicative of at least one of the corresponding pair of nodes for each link.

5. The method of claim 1, wherein the displaying the data transmission schedule includes displaying a waterfall chart.

6. The method of claim 1, further comprising determining a conflict between a scheduled data flow and an unscheduled data flow of the unscheduled set of data flows with respect to a link in the respective path; and modifying data flow requirements of at least one of the scheduled flow and the unscheduled flow to eliminate the conflict.

7. The method of claim 6, wherein the modifying data flow requirements of at least one of the scheduled flow and the unscheduled flow to eliminate the conflict is based on inputs received from a user.

8. The method of claim 6, wherein the modifying the data flow requirements includes modifying at least one of a frame size, an interval, a classification, and a relative timing of the data flow with respect to the link in the respective path.

9. The method of claim 1, wherein the scheduling a respective transmission of a subset of data flows on a respective path includes determining a conflict between an unscheduled data flow and a scheduled data flow with respect to a link in the respective path.

10. The method of claim 9, further comprising displaying information indicative of the unscheduled data flow, the link, and the scheduled data flow with which the conflict occurs.

11. A data communication network comprising:
a set of nodes communicatively coupled by a set of links, each link coupling a corresponding pair of nodes;
a display device;
a scheduler module communicatively coupled to the display device, the scheduler module configured to:
identify an unscheduled set of data flows to be scheduled for a respective transmission on a subset of the set of links, the subset of the set of links defining a respective path from a first originating node to a second destination node;
define a schedule for a respective transmission of a subset of the set of data flows on a respective path, wherein the schedule includes a start time, a duration, and a cycle time of the transmission with respect to each respective link on the respective path;
determine a conflict between an unscheduled data flow of the unscheduled set of data flows and a scheduled data flow with respect to a link in the respective path;
prevent a scheduling of the unscheduled data flow having the conflict with the scheduled data flow with respect to the link in the respective path; and
provide information indicative of the unscheduled data flow, a first link, and the scheduled flow with which the conflict occurs, to the display device;
wherein the display device is configured to display, for each scheduled data flow, an image depicting each respective link of the respective path, and to display, for each scheduled data flow, a transmission schedule chart with respect to each respective link in the respective path; and
wherein the scheduler module is further configured to modify data flow requirements of at least one of the scheduled flow and the unscheduled flow to eliminate the conflict.

12. The data communication network of claim 11, wherein the image depicting each respective link of the path is further depicted overlaying an image representative of a physical topology of the network.

13. The data communication network of claim 11, wherein the image depicting each respective link of the path further includes a visual indication of a direction of the data flow.

14. The data communication network of claim 11, wherein the display of the data transmission schedule includes a start time, a duration, and a cycle time of the data flow with respect to each link in the path.

15. The data communication network of claim 11, wherein the display of the data transmission schedule includes an element for each link in the path.

16. The data communication network of claim 11, wherein the display of the data transmission schedule includes a label indicative of at least one of the corresponding pair of nodes for each link.

17. The data communication network of claim 11, wherein the display of the data transmission schedule comprises a waterfall chart.

18. The data communication network of claim 11, wherein the scheduler module is further configured to modify data flow requirements of at least one of the scheduled flow and the unscheduled flow to eliminate the conflict.

19. The data communication network of The data communication network of wherein the scheduler module is configured to modify the data flow requirements of at least one of the scheduled flow and the unscheduled flow to eliminate the conflict based on inputs received from a user.

20. The data communication network of claim 18, wherein the scheduler module is further configured to modify at least one of a at least one of frame size, interval, a classification, and a relative timing of the data flow with respect to the link in the respective path.

* * * * *